United States Patent
Kobayashi et al.

(10) Patent No.: US 11,057,541 B2
(45) Date of Patent: Jul. 6, 2021

(54) IMAGE PROCESSING APPARATUS, PRINTING SYSTEM, AND IMAGE PROCESSING METHOD

(71) Applicant: SEIKO EPSON CORPORATION, Tokyo (JP)

(72) Inventors: Takashi Kobayashi, Nagano (JP); Yasutoshi Takeuchi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/819,359

(22) Filed: Mar. 16, 2020

(65) Prior Publication Data

US 2020/0304680 A1 Sep. 24, 2020

(30) Foreign Application Priority Data

Mar. 18, 2019 (JP) .............................. JP2019-049459

(51) Int. Cl.
| | | |
|---|---|---|
| G06K 1/00 | (2006.01) | |
| G06K 15/00 | (2006.01) | |
| H04N 1/387 | (2006.01) | |
| H04N 1/393 | (2006.01) | |
| H04N 1/00 | (2006.01) | |

(52) U.S. Cl.
CPC ....... H04N 1/3875 (2013.01); H04N 1/00334 (2013.01); H04N 1/3935 (2013.01)

(58) Field of Classification Search
CPC . H04N 1/3875; H04N 1/00334; H04N 1/3935
USPC .................. 358/1.1, 1.18, 1.9, 3.12
See application file for complete search history.

(56) References Cited

U.S. PATENT DOCUMENTS

| | | | | |
|---|---|---|---|---|
| 2009/0078766 A1* | 3/2009 | Furuyama | .......... | G06K 7/10722 235/454 |
| 2011/0235944 A1* | 9/2011 | Ernst | ...................... | G06T 3/4007 382/299 |
| 2015/0004558 A1* | 1/2015 | Inglese | ................ | A61B 6/4233 433/29 |
| 2019/0332377 A1* | 10/2019 | Kajikawa | ........... | G06K 9/00442 |

FOREIGN PATENT DOCUMENTS

| | | |
|---|---|---|
| JP | 07-177348 A | 7/1995 |
| JP | 2006-259045 A | 9/2006 |
| JP | 2008-146406 A | 6/2008 |
| JP | 2009-272667 A | 11/2009 |

* cited by examiner

*Primary Examiner* — Douglas Q Tran
(74) *Attorney, Agent, or Firm* — Global IP Counselors, LLP (57) ABSTRACT

An image processing apparatus includes: a code detector configured to detect a code included in image data, and a number-of-pixels converting unit configured to increase the number of pixels of the image data by converting the number of pixels of the image data by a factor of N, wherein, when N is a non-integer, the number-of-pixels converting unit converts the number of pixels in a first region including the code in the image data by an integer factor and converts the number of pixels in a second region different from the first region in the image data by a factor of N.

7 Claims, 6 Drawing Sheets

IMAGE PROCESSING APPARATUS, PRINTING SYSTEM, AND IMAGE PROCESSING METHOD

The present application is based on, and claims priority from JP Application Serial Number 2019-049459, filed Mar. 18, 2019, the disclosure of which is hereby incorporated by reference herein in its entirety.

BACKGROUND

1. Technical Field

The present disclosure relates to an image processing apparatus and an image processing method for executing number-of-pixels conversion of image data.

2. Related Art

In image processing for image data, a number-of-pixels conversion process of converting the number of pixels of the image data according to output conditions of printing or the like is performed.

In the related art, an image processing apparatus is disclosed that detects a first region having barcode information and a second region having no barcode information from image data and performs resolution conversion on the second region to obtain a second resolution lower than a first resolution for the first region (see JP-A-2009-272667).

When number-of-pixels conversion is performed on image data including a code such as a barcode, there is concern that unnecessary halftone data of color may be generated in a region of a code after conversion or a ratio between elements constituting the code may vary depending on a conversion magnification, and quality of the code may decrease.

SUMMARY

An image processing apparatus includes: a code detector configured to detect a code included in image data, and a number-of-pixels converting unit configured to increase the number of pixels of the image data by converting the number of pixels of the image data by a factor of N, wherein, when N is a non-integer, the number-of-pixels converting unit converts, by an integer factor, the number of pixels in a first region including the code in the image data and converts, by a factor of N, the number of pixels in a second region different from the first region in the image data.

An image processing apparatus includes: a code detector configured to detect a code included in image data, and a number-of-pixels converting unit configured to decrease the number of pixels of the image data by converting the number of pixels of the image data by a factor of 1/N, wherein, when N is a non-integer, the number-of-pixels converting unit, using an integer M, converts the number of pixels in a first region including the code in the image data by a factor of 1/M and converts the number of pixels in a second region different from the first region in the image data by a factor of 1/N.

DESCRIPTION OF EXEMPLARY EMBODIMENTS

Hereinafter, embodiments of the present disclosure will be described with reference to the accompanying drawings. The figures are merely illustrative for description of the embodiments. Since the figures are illustrative, they may contain inconsistencies and partial omissions.

1. CONFIGURATION OF APPARATUS

Figure 1:
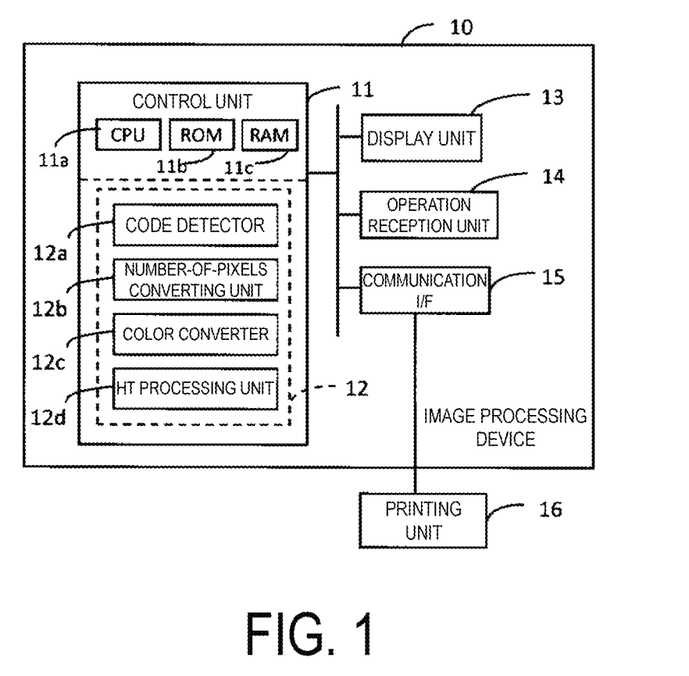
FIG. 1 is a schematic block diagram illustrating a configuration of an image processing apparatus.

FIG. 1 simply illustrates a configuration of an image processing apparatus 10 according to the embodiment.

The image processing apparatus 10 executes an image processing method. The image processing apparatus 10 includes a control unit 11, a display unit 13, an operation reception unit 14, a communication interface 15, and the like. "Interface" is abbreviated to "IF". The control unit 11 includes one or a plurality of ICs including a CPU 11a serving as a processor, a ROM 11b, a RAM 11c, and the like, and another non-volatile memory or the like.

The control unit 11 controls the image processing apparatus 10 by the processor, that is, the CPU 11a executing a calculation process according to a program stored in the ROM lib, the other memory, or the like using the RAM 11c or the like as a work area. The control unit 11 functions as a code detector 12a, a number-of-pixels converting unit 12b, a color converting unit 12c, an HT processing unit 12d, and the like according to an image processing program 12. "HT" is an abbreviation for "halftone". The processor is not limited to one CPU, and a configuration in which a process is performed by a plurality of CPUs or a hardware circuit such as an ASIC, or a configuration in which the CPU and the hardware circuit cooperate to perform the process may be adopted.

The display unit 13 is a means for displaying visual information, and is constituted by, for example, a liquid crystal display or an organic EL display. The display unit 13 may be configured to include a display and a drive circuit for driving the display. The operation reception unit 14 is a means for receiving an operation of a user, and is realized by, for example, physical buttons, a touch panel, a mouse, or a keyboard. Of course, the touch panel may be realized as a function of the display unit 13.

The display unit 13 or the operation reception unit 14 may be a part of the configuration of the image processing apparatus 10, but may be a peripheral device external to the image processing apparatus 10. "Communication IF 15" is a generic term for one or a plurality of IFs that are used for the image processing apparatus 10 to execute wired or wireless communication with the outside in compliance with a predetermined communication protocol including a known communication standard.

The printing unit 16 is an external device that the image processing apparatus 10 connects via the communication IF 15. That is, the printing unit 16 is a printing device that is controlled by the image processing apparatus 10. The printing device is also referred to as a printer, a recording device, or the like. The printing unit 16 is capable of executing printing on a printing medium using an ink-jet scheme, an electrophotographic scheme, or the like based on printing data that is transmitted from the image processing apparatus 10. Although the printing medium is typically paper, the printing medium may be a medium of a material other than paper. For example, according to an inkjet scheme, dots of ink are recorded on the printing medium based on the printing data.

The image processing apparatus 10 is realized by, for example, a personal computer, a smartphone, a tablet terminal, a mobile phone, or an information processing apparatus having the same degree of processing capability as such a device. Further, the image processing apparatus 10 may be realized not only by one independent information processing apparatus, but also by a plurality of information processing apparatuses communicatively connected to each other via a network.

A configuration including the image processing apparatus 10 and the printing unit 16 can be regarded as a system. Alternatively, the image processing apparatus 10 and the printing unit 16 may be integrated devices. That is, a configuration in which one printing device includes the image processing apparatus 10 and the printing unit 16 may be adopted.

2. IMAGE PROCESSING

2-1. First Embodiment

Figure 2:
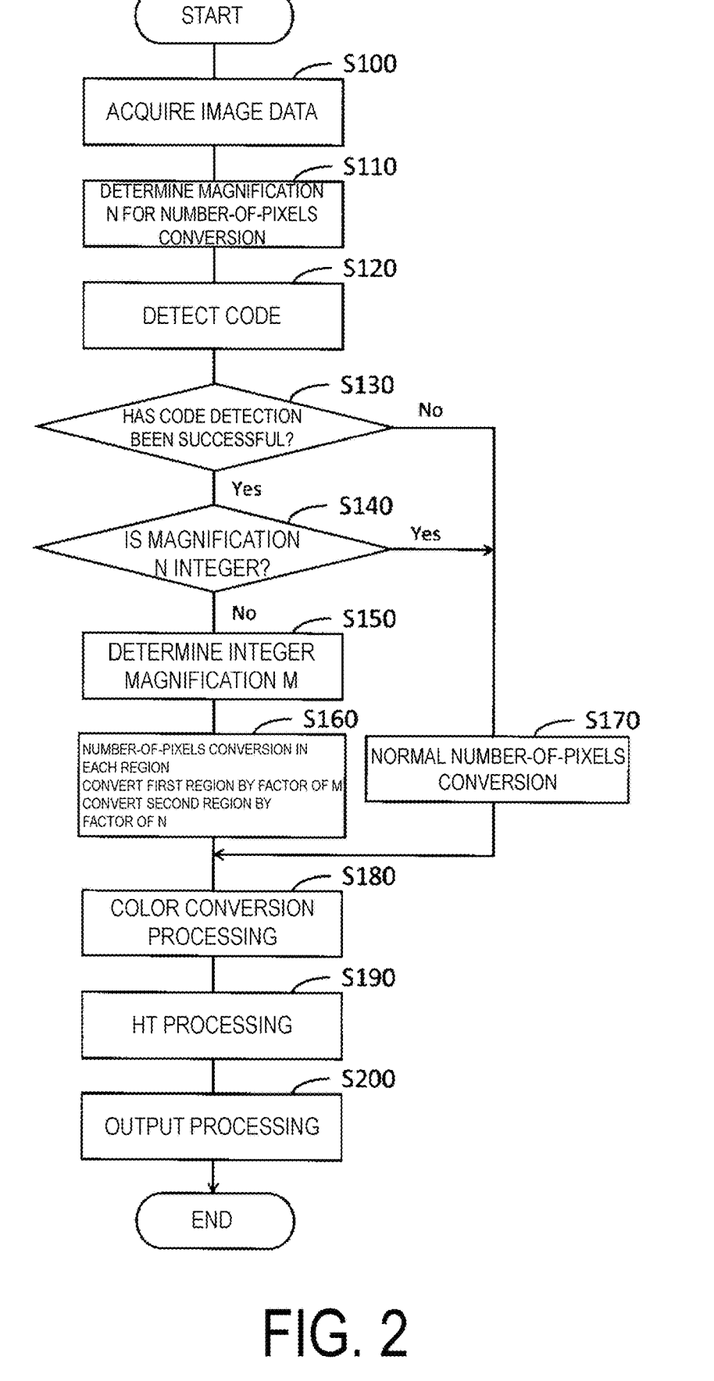
FIG. 2 is a flowchart illustrating image processing according to a first embodiment.

FIG. 2 illustrates a flowchart of image processing according to a first embodiment that the control unit 11 executes according to the image processing program 12.

In step S100, the control unit 11 acquires image data that is a processing target. The control unit 11 acquires the image data, for example, from a storage source for image data in response to an image data selection instruction from the user via the operation reception unit 14. There are various storage sources for image data, such as a memory or a hard disk drive in the image processing apparatus 10, or an external memory or server that can be accessed by the control unit 11.

The image data is, for example, bitmap data having an RGB (red, green, and blue) gray-scale value for each pixel. Of course, the control unit 11 can obtain the RGB bitmap data as a processing target by appropriately converting a format of the acquired image data.

In step S110, the number-of-pixels converting unit 12*b* determines a magnification N for number-of-pixels conversion of the image data. The number-of-pixels conversion is basically a process of adjusting resolution of image data to printing resolution of the printing unit 16. For example, when a resolution of the image data is 360 dpi in vertical and horizontal directions and a printing resolution is 720 dpi in vertical and horizontal directions, the number of pixels in vertical and horizontal directions of the image data is doubled. In this case, N=2. Dpi represents the number of pixels per inch.

The number-of-pixels converting unit 12*b* determines magnifications N in both vertical and horizontal directions for conversion of the numbers of pixels in both vertical and horizontal directions in the image data to the number of pixels necessary for output conditions for the printing unit 16. The output conditions are printing resolution, a size of the printing medium that is used for printing by the printing unit 16, and the like. It is assumed that the output conditions are known to the control unit 11 according to product specifications of the printing unit 16 or settings regarding printing input by the user via the operation reception unit 14 in advance.

According to a ratio between the number of pixels of the image data and the number of pixels necessary for the output conditions, the magnification for the number-of-pixels conversion is greater than 1 or less than 1 and greater than 0. When the magnification is greater than 1, the number-of-pixels conversion becomes a process of increasing the number of pixels, and when the magnification is less than 1 and greater than 0, the number-of-pixels conversion is a process of decreasing the number of pixels. The increase in the number of pixels is realized by interpolation of the pixels, and the decrease in the number of pixels is realized by decimation of pixels.

The first embodiment is a description of a case in which the magnification for the number-of-pixels conversion is greater than 1.

In step S120, the code detector 12*a* detects the code from the image data. In the embodiment, "code" refers to a type of pattern image in which information is encoded. Specifically, the code is a barcode, a QR code (registered trademark), or another two-dimensional code. Various methods including known methods can be adopted as a method of detecting the code. For example, the code detector 12*a* can detect, as a barcode, a pattern image in which a predetermined number or more of bars of a single color are arranged in a direction intersecting a length direction of the bars in the image data.

A sequence of execution of steps S110 and S120 may be reversed from the sequence illustrated in FIG. 2. Alternatively, steps S110 and S120 may be performed in parallel.

In step S130, the code detector 12*a* proceeds to subsequent processes branching according to whether or not the detection of the code from the image data in step S120 has been successful. When the code detector 12*a* has successfully detected one or more codes from the image data in step S120, the code detector 12*a* proceeds to a process of step S140 from the determination of "Yes" in step S130. On the other hand, when the code detector 12*a* has not detected the code from the image data in step S120, the code detector 12*a* proceeds to a process of step S170 from the determination of "No" in step S130.

In step S140, the number-of-pixels converting unit 12*b* proceeds to subsequent processes that branch according to whether or not the magnification N determined in step S110 is an integer. When the magnification N is an integer, the number-of-pixels converting unit 12*b* proceeds to a process of step S170 from the determination of "Yes" in step S140. On the other hand, when the magnification N is not an integer, that is, is a non-integer, the number-of-pixels converting unit 12*b* proceeds to a process of step S150 from the determination of "No" in step S140. In the embodiment, "integer" refers to an integer equal to or greater than 1.

Although the description has been simplified in FIG. 2, the control unit 11 executes a number-of-pixels conversion process (step S140 to S160 or step S140 and S170) including the determination of the magnification N (step S110) and the determination of step S140 in vertical and horizontal directions of the image data.

In step S170, the number-of-pixels converting unit 12*b* executes normal number-of-pixels conversion using the magnification N determined in step S110. That is, the number-of-pixels converting unit 12*b* increases the number of pixels of the image data by converting the number of pixels of the image data by a factor of N. In the normal number-of-pixels conversion, the same magnification is applied to a first region and a second region to be described below without the first region and the second region being distinguished.

In step S150, a magnification M for the number-of-pixels conversion of a region including the code detected in step S120 is determined. M is an integer. The number-of-pixels converting unit 12b determines an integer closest to the magnification N to be the magnification M. For example, when N=2.2, M=2. Further, for example, when N=2.8, M=3.

However, there may be two integers closest to the magnification N. For example, when N=2.5, the integers closest to N are 2 and 3. Thus, when there are two integers closest to the magnification N, the number-of-pixels converting unit 12b may determine the lower of the two integers closest to the magnification N to be the magnification M.

Alternatively, the number-of-pixels converting unit 12b may determine an integer closest to the magnification N among integers smaller than the magnification N to be the magnification M. For example, when N=2.2, M=2. Further, for example, even when N=2.8, M=2.

In step S160, the number-of-pixels converting unit 12b executes number-of-pixels conversion in each region using the magnification N determined in step S110 and the magnification M determined in step S150. The region including the code detected from the image data is referred to as a "first region". A region different from the first region in the image data is referred to as a "second region". That is, in the number-of-pixels converting unit for each region, the number-of-pixels converting unit 12b converts the number of pixels in the first region by a factor of M and converts the number of pixels in the second region by a factor of N.

Figure 3:
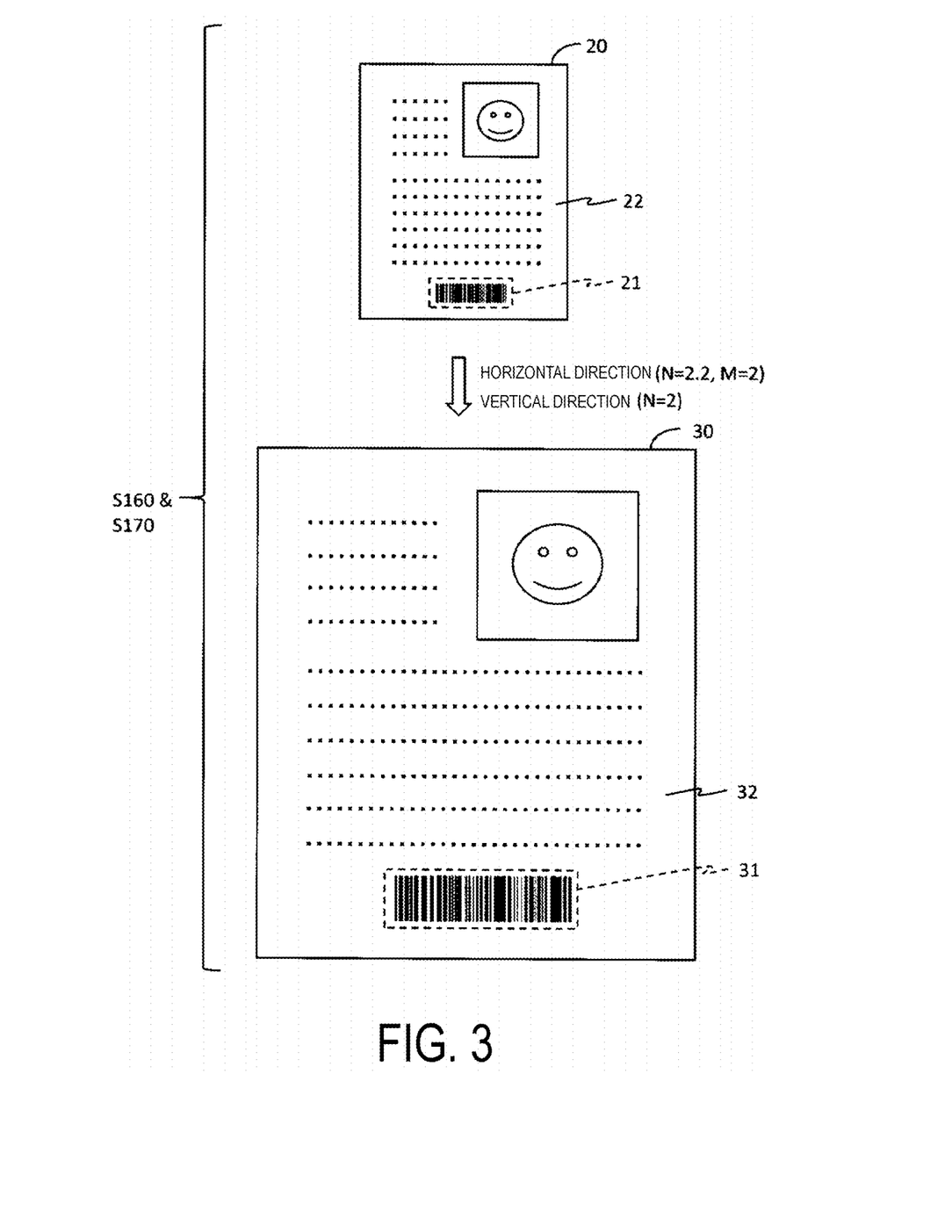
FIG. 3 is a diagram illustrating an example of a number-of-pixels conversion according to the first embodiment.

FIG. 3 is a diagram illustrating an example of the number-of-pixels conversion according to the first embodiment. In FIG. 3, the image data 20 is image data before the number-of-pixels conversion, and the image data 30 is image data after the number-of-pixels conversion has been performed on the image data 20. In the image data 20, some objects such as characters, illustrations, photographs, and the like, for example, are expressed in some color. In the example of FIG. 3, it is assumed that, for the magnification N for the number-of-pixels conversion determined in step S110 for the image data 20, the magnification N in a horizontal direction of the image is "2.2", and the magnification N in the vertical direction of the image is "2". In this case, since the magnification N in the vertical direction of the image is the integer "2", the number-of-pixels converting unit 12b executes normal number-of-pixels conversion for doubling the number of pixels in the vertical direction of the image data 20 in step S170 proceeding from "Yes" in step S140.

Reference numeral 21 indicates the first region including the code detected from the image data 20 in step S120. Such a first region 21 corresponding to the code may be present at a plurality of locations in the image data 20. A region different from the first region 21 in the image data 20 is a second region 22. The second region 22 includes the above-described object. A region denoted by reference numeral 31 in the image data 30 is a first region 31 after the number-of-pixels conversion has been performed on the first region 21. The region different from the first region 31 in the image data 30 is a second region 32 after number-of-pixels conversion.

In the example of FIG. 3, the magnification N in the horizontal direction of the image is the non-integer "2.2". Thus, in step S150 proceeding from "No" in step S140, the number-of-pixels converting unit 12b determines, for example, the magnification M=2 in correspondence to the magnification N=2.2 in the horizontal direction of the image.

In step S160, the number-of-pixels converting unit 12b executes number-of-pixels conversion in each region for doubling the number of pixels in a horizontal direction of the first region 21 of the image data 20 and converting the number of pixels in a horizontal direction of the second region 22 of the image data 20 by a factor of 2.2.

When M>N, a ratio of a size of the first region to a size of the image data is higher after the number-of-pixels conversion than before the number-of-pixels conversion. When N>M, the ratio of the size of the first region to the size of the image data is lower after the number-of-pixels conversion than before the number-of-pixels conversion. When N>M, a gap is created between the first region 31 and the second region 32 after the number-of-pixels conversion due to a difference between the magnifications N and M. The number-of-pixels converting unit 12b fills such a gap using the pixels in the second region 32. The number-of-pixels converting unit 12b, for example, may fill the gap using pixels with the same color as the pixels in the second region 32 surrounding the gap. Therefore, in the example of FIG. 3, in an overall size of the image data 30, the number of pixels in a vertical direction is doubled and the number of pixels in a horizontal direction is increased by a factor of 2.2 compared to the image data 20.

After step S160 and/or step S170, the color converting unit 12c executes a color conversion process on the image data after the number-of-pixels conversion (step S180). The color conversion process is a process of converting a color system of image data to an output color system that the printing unit 16 uses for printing. The color system of the image data is, for example, RGB described above, and the output color system is, for example, a color system using a plurality of ink colors such as cyan, magenta, yellow, and black.

In step S190, the HT processing unit 12d performs HT processing on the image data after the color conversion. Schematically, the HT processing is a process of binarizing a gray-scale value for each pixel and ink color of the image data into information indicating ink recording (dot on) or ink non-recording (dot off).

In step S200, the control unit 11 outputs the image data after the HT processing to the printing unit 16 as the printing data. In the output process of step 200, the image data after HT processing is sorted appropriately according to a timing or an sequence at or in which the printing unit 16 uses the image data, and then output to the printing unit 16. Such an output process is also referred to as a rasterization process. As a result, the printing unit 16 executes printing based on the printing data output from the image processing apparatus 10.

Figure 4:
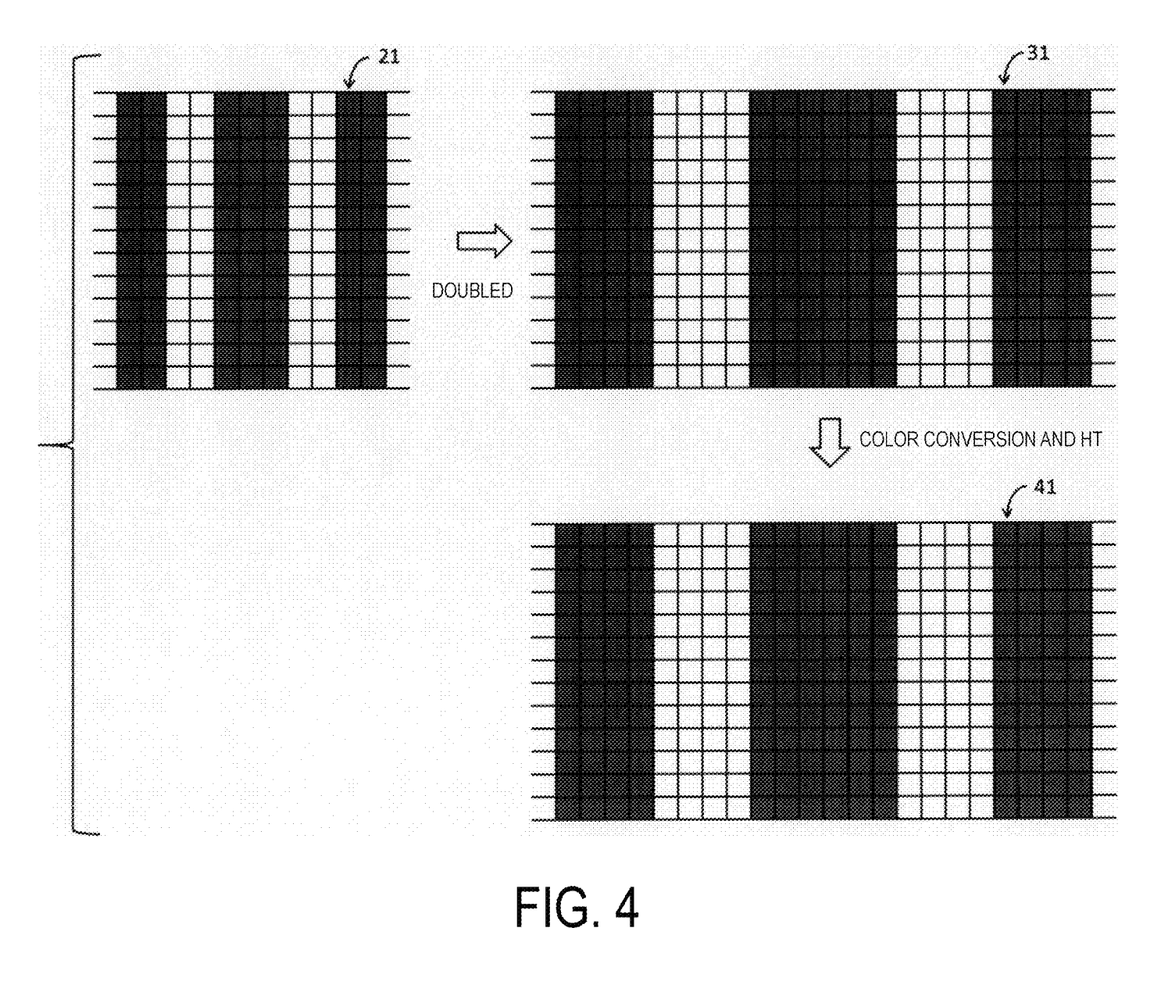
FIG. 4 is a diagram illustrating effects of the number-of-pixels conversion according to the first embodiment.

FIG. 4 is a diagram illustrating effects of the number-of-pixels conversion according to the first embodiment.

Figure 5:
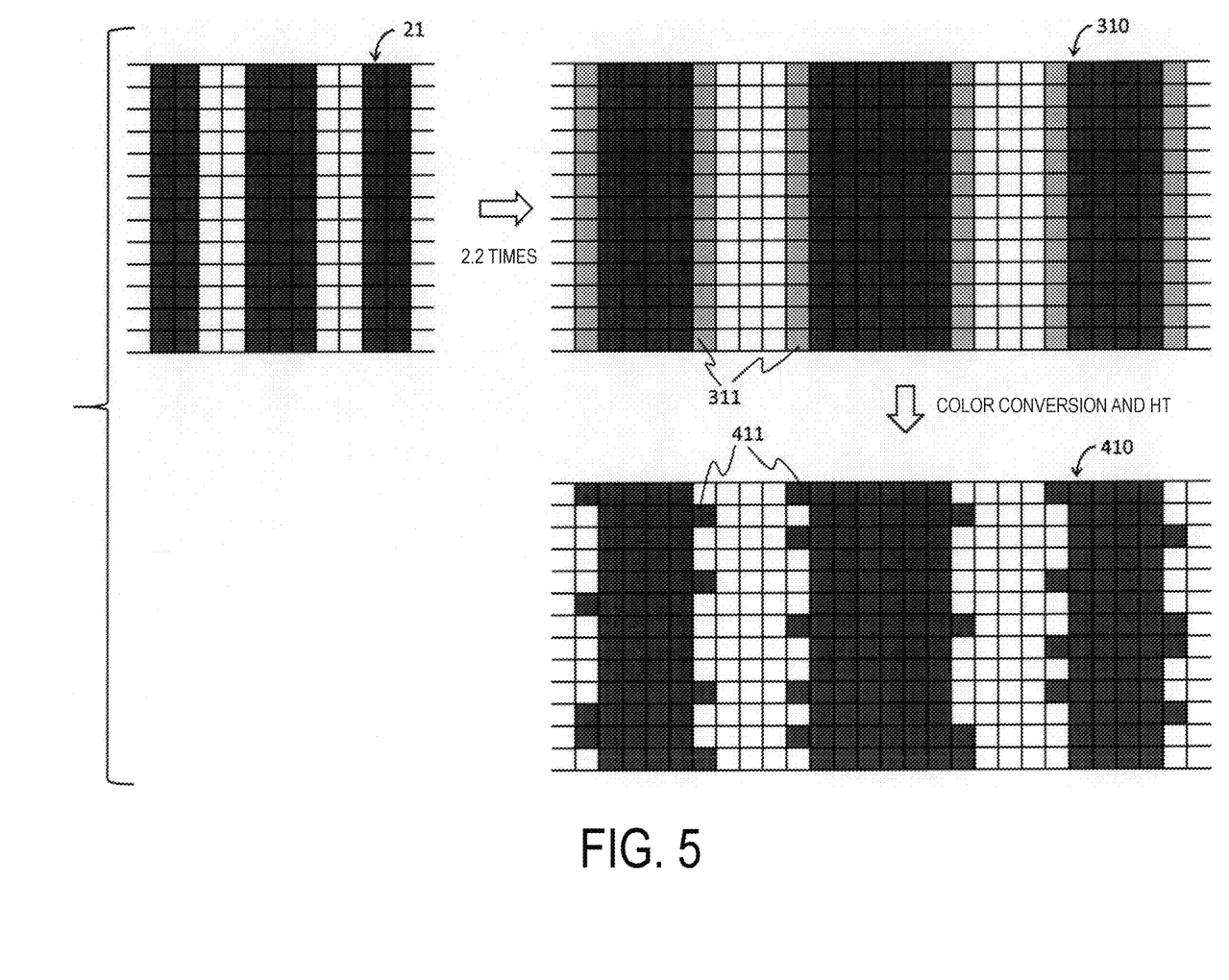
FIG. 5 is a diagram illustrating a related art as a comparative example with respect to FIG. 4.

FIG. 5 illustrates a comparative example with respect to FIG. 4, and is a diagram illustrating the related art. In FIGS. 4 and 5, a state in which image data transitions by performing number-of-pixels conversion, color conversion, and HT processing on the first region 21 in the image data 20 is simply illustrated. In FIGS. 4 and 5, an example in which number-of-pixels conversion is performed in the horizontal direction of the image is illustrated, and respective viewpoints are substantially the same. Individual rectangles illustrated in FIGS. 4 and 5 are individual pixels constituting the image data. The first region 21 of FIGS. 4 and 5 represents a portion of the barcode. That is, in the first region 21, a set of pixels with the color gray is bars constituting the barcode, and a set of pixels with the color white is blanks between the bars. Elements constituting the code as an image like the bars constituting the barcode are referred to as "code elements". Further, blanks between the code elements like the blanks between the bars are referred to as "inter-element blanks".

In FIG. 4, the magnification for the number-of-pixels conversion is "2". As described above, in the first embodiment, even when the magnification N determined in step S110 is a non-integer, the magnification M for the first region 21 is an integer. When the number of pixels in the first region 21 is converted by an integer factor, each of the color of the code element and the color of the inter-element blank is copied, and the pixels of each code element and the pixels of each inter-element blank are simply converted by an integer factor. Therefore, a color that does not correspond to either of the color of the code element and the color of the inter-element blank is not generated in the first region 31 after the number-of-pixels conversion.

Reference numeral 41 in FIG. 4 denotes a first region after the color conversion process and the HT processing have been performed on the first region 31. Each pixel constituting the first region 41 defines any one of the ink recording and ink non-recording. That is, the pixels with the color gray in the first region 41 are dot-on-pixels, and pixels with the color white are dot-off-pixels.

On the other hand, in FIG. 5, the magnification for the number-of-pixels conversion is "2.2". In number-of-pixels conversion of the related art, a magnification derived according to a ratio between the number of pixels of image data before number-of-pixels conversion and the number of pixels necessary for the output conditions is applied to all of the image data 20 including the first region 21. Accordingly, the number of pixels in the first region 21 may be converted by a non-integer factor. When the number of pixels in the first region 21 is converted by a non-integer factor, a color between the color of the code element and the color of the inter-element blank, that is, halftone data, is generated by interpolation. In FIG. 5, a pixel with a light gray color shown in a first region 310 after the number-of-pixels conversion is a halftone pixel 311 having such halftone data.

Reference numeral 410 in FIG. 5 denotes a first region after a color conversion process and HT processing have been performed on the first region 310. In the first region 410 in FIG. 5, pixels with the color gray are dot-on-pixels, and pixels with the color white are dot-off-pixels, similar to the first region 41 in FIG. 4. When HT processing has been performed on the halftone pixel 311, the halftone pixel 311 is converted to a dot on pixel or converted to a dot-off-pixel. In FIG. 5, a pixel denoted by reference numeral 411 is a dot-on-pixel 411 converted from the halftone pixel 311.

In a configuration of the related art in which the number of pixels in the first region 21 may be converted by a non-integer factor, it is easy for the halftone pixel 311 to be generated between the code element and the inter-element blank. Thereby, the dot-on-pixel 411 is generated. The dot-on-pixel 411 destabilizes a shape of the code elements such as the bars constituting the barcode, and degrades the quality of the code. The degraded quality code may not be read correctly. On the other hand, in the number-of-pixels conversion of the first embodiment, the number of pixels in the first region 21 is necessarily converted by an integer factor. Therefore, the halftone pixel 311 is not generated and, accordingly, a degradation in the quality of the code does not occur.

2-2. Second Embodiment

Figure 6:
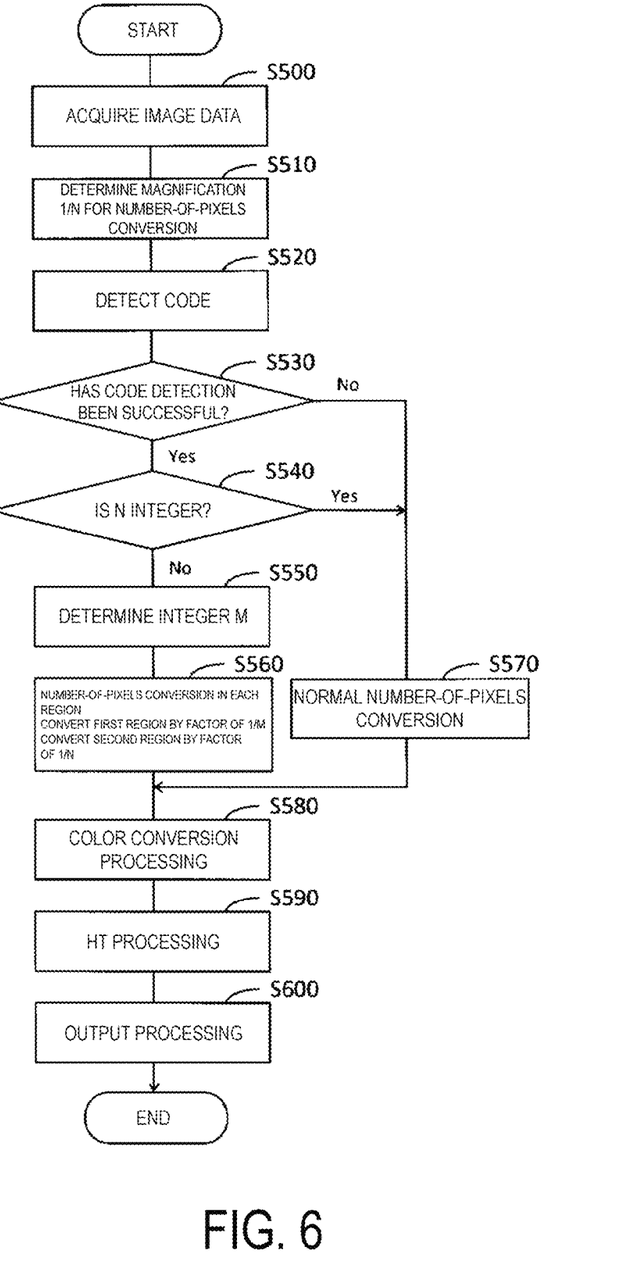
FIG. 6 is a flowchart illustrating image processing according to a second embodiment.

FIG. 6 illustrates a flowchart of image processing according to a second embodiment that the control unit 11 executes according to the image processing program 12. Differences between the second embodiment and the first embodiment described with reference to FIG. 2 or the like will be mainly described.

Step S500 is the same process as step S100.

In step S510, the number-of-pixels converting unit 12b determines a magnification 1/N for the number-of-pixels conversion of the image data. As described in step S110, the number-of-pixels converting unit 12b determines magnifications in both vertical and horizontal directions for conversion of the number of pixels in both vertical and horizontal directions in the image data to the number of pixels necessary for the output conditions of the printing unit 16.

In the sense of determining the magnification for the number-of-pixels conversion, step S110 and step S510 are the same processing. When the magnification determined as described above is greater than 1, the number-of-pixels converting unit 12b treats the magnification as N and executes step S120 and the subsequent steps of the first embodiment. On the other hand, when the magnification determined as described above is less than 1 and greater than 0, the number-of-pixels converting unit 12b treats the denominator when the magnification is expressed as a fraction with a numerator of 1 as N, and executes step S520 and the subsequent steps of the second embodiment.

Step S520 is the same process as step S120.

In step S530, when the code detector 12a has successfully detected the code from the image data in step S520, the code detector 12a proceeds to a process of step S540 from the determination of "Yes". On the other hand, when the code detector 12a has not detected the code from the image data in step S520, the code detector 12a proceeds to a process of step S570 from the determination of "No" in step S530.

In step S540, the number-of-pixels converting unit 12b proceeds to subsequent processes branching according to whether the denominator N of the magnification 1/N determined in step S510 is an integer. When N is an integer, the number-of-pixels converting unit 12b proceeds to the process of step S570 from the determination of "Yes" in step S540. On the other hand, when N is not an integer, the number-of-pixels converting unit 12b proceeds to the process of step S550 from the determination of "No" in step S540. The control unit 11 executes the number-of-pixels conversion process (steps S540 to S560 or steps S540 and S570) including the determination of the magnification 1/N (step S510) and the determination of step S540 in each of vertical and horizontal directions of the image data.

In step S570, the number-of-pixels converting unit 12b executes normal number-of-pixels conversion using the magnification 1/N determined in step S510. That is, the number-of-pixels converting unit 12b decreases the number of pixels of the image data by converting the number of pixels of the image data by a factor of 1/N.

In step S550, a denominator M of the magnification 1/M for number-of-pixels conversion of the first region including the code detected in step S520 is determined. M is an integer. The number-of-pixels converting unit 12b determines an integer closest to N to be M. However, when there are two integers closest to N, the number-of-pixels converting unit 12b may determine the smaller of the two integers closest to N to be M. Alternatively, the number-of-pixels converting unit 12b may determine the integer closest to N among integers smaller than N to be M.

In step S560, the number-of-pixels converting unit 12b executes the number-of-pixels conversion on each region using the magnification 1/N determined in step S510 and the magnification 1/M with the integer M determined in step S550 as a denominator. That is, the number-of-pixels converting unit 12b converts the number of pixels in the first region by a factor of 1/M and converts the number of pixels in the second region by a factor of 1/N. When 1/M>1/N, a ratio of the size of the first region to the size of the image data is higher after the number-of-pixels conversion than before the number-of-pixels conversion. When 1/N>1/M, the ratio of the size of the first region to the size of the image data is lower after the number-of-pixels conversion than before the number-of-pixels conversion. When 1/N>1/M, a gap is created between the first region and the second region after the number-of-pixels conversion due to a difference between the magnifications 1/N and 1/M. The number-of-pixels converting unit 12b fills such a gap using the pixels in the second region. Steps S580, S590, and S600 after step S560 and/or step S570 are the same processes as steps S180, S190, and S200.

3. CONCLUSION

As described above, according to the first embodiment, the image processing apparatus 10 includes a code detector 12a configured to detect the code included in the image data, and the number-of-pixels converting unit 12b configured to increase the number of pixels of the image data by converting the number of pixels of the image data by a factor of N. When N is a non-integer, the number-of-pixels converting unit 12b converts the number of pixels in the first region including the code in the image data by an integer factor, and converts the number of pixels in the second region different from the first region in the image data by a factor of N.

According to the above configuration, even when the magnification N used for the number-of-pixels conversion of the image data is a non-integer, an integer may be used as the magnification for the number-of-pixels conversion for the first region including the code in the image data. Accordingly, halftone data is not generated in the first region after the number-of-pixels conversion, and a degradation in the quality of the code is avoided.

Further, the number-of-pixels converting unit 12b may determine an integer M closest to N when N is a non-integer, and convert the number of pixels in the first region by a factor of M.

According to the above configuration, it is possible to make a deviation between the magnification of the second region and the magnification in the first region in the number-of-pixels conversion as small as possible.

Further, when there are two integers closest to N, the number-of-pixels converting unit 12b may determine the smaller of the two integers to be the integer M.

According to the above configuration, it is possible to easily determine a magnification of the first region of which a deviation from the magnification of the second region is as small as possible in the number-of-pixels conversion. Further, it is possible to avoid a case in which the first region after number-of-pixels conversion overlaps a portion of the object in the second region after the number-of-pixels conversion.

Further, when N is a non-integer, the number-of-pixels converting unit 12b may determine an integer M closest to N among integers smaller than N, and convert the number of pixels in the first region by a factor of M.

According to the above configuration, it is possible to easily determine a magnification of the first region of which a deviation from the magnification of the second region is as small as possible in the number-of-pixels conversion. Further, it is possible to avoid a case in which the first region after number-of-pixels conversion overlaps a portion of the object in the second region after the number-of-pixels conversion.

Further, according to the first embodiment, the image processing method including the code detection step (step S120) of detecting the code included in the image data, and the number-of-pixels conversion step (steps S140 to S160 or steps S140 and S170) of increasing the number of pixels of the image data by converting the number of pixels of the image data by a factor of N, wherein the number-of-pixels conversion step includes converting the number of pixels in the first region including the code in the image data by an integer factor and converting the number of pixels in the second region different from the first region in the image data by a factor of N when N is a non-integer (step S160) is disclosed.

Further, according to the second embodiment, the image processing apparatus 10 includes the code detector 12a configured to detect the code included in the image data, and the number-of-pixels converting unit 12b configured to decrease the number of pixels of the image data by converting the number of pixels of the image data by a factor of 1/N. When N is a non-integer, the number-of-pixels converting unit 12b converts the number of pixels in the first region including the code in the image data by a factor of 1/M using the integer M, and converts the number of pixels in the second region different from the first region in the image data by a factor of 1/N.

According to the above configuration, even when the denominator N of the magnification 1/N used for the number-of-pixels conversion of the image data is a non-integer, the magnification 1/M with the integer M as a denominator is used as the magnification for the number-of-pixels conversion for the first region including the code in the image data. Thereby, degradation in quality of the code in the first region after the number-of-pixels conversion is curbed.

For example, in the image data, a plurality of pixel rows in which pixels with a predetermined color are continuous in the vertical direction of the image are continuous in the horizontal direction of the image represent bars as elements of a barcode. Each bar of the barcode is constituted as, for example, a four-pixel row or a two-pixel row, and a thickness thereof varies. When a first case in which the number of pixels is decreased by multiplying the number of pixels of the first region including such a barcode by the magnification 1/N with a non-integer N as a denominator is compared with a second case in which the number of pixels is decreased by multiplying the number of pixels of the first region by the magnification 1/M with an integer M as a denominator, the second case has less variation in a ratio between thicknesses of the bars before and after the number-of-pixels conversion. For example, in a first case in which the number of pixel rows in the first region is decimated and converted by a factor of 1/2.2, and a second case in which the number of pixel rows in the first region is decimated and simply converted by a factor of 1/2, a ratio between the thicknesses of the bars is more easily maintained in the second case. Therefore, according to the second embodiment, it can be said that deterioration in the quality of the code due to the number-of-pixels conversion is curbed.

Further, according to the second embodiment, the image processing method including the code detection step (step S520) of detecting the code included in the image data, and the number-of-pixels conversion step (steps S540 to S560 or steps S540 and S570) of decreasing the number of pixels of the image data by converting the number of pixels of the image data by a factor of 1/N, wherein, when N is a non-integer, the number-of-pixels conversion step includes, using the integer M, converting the number of pixels in the first region including the code in the image data by a factor of 1/M and converting the number of pixels in the second region different from the first region in the image data by a factor of 1/N (step S560) is disclosed.

4. OTHER EMBODIMENTS

Some of various aspects included in the embodiment will be described.

The number-of-pixels converting unit 12b may hold a position of the first region with respect to the image data before and after the number-of-pixels conversion when the number-of-pixels converting unit 12b executes the number-of-pixels conversion in each of the regions in step S160 or step S560. The number-of-pixels converting unit 12b defines a reference point of the image data. The reference point of the image data is, for example, an upper left corner of the image data. The number-of-pixels converting unit 12b, for example, adjusts the position of the first region after the number-of-pixels conversion so that a ratio between a length of the image data and a distance to a centroid of the first region in a horizontal direction from the reference point and a ratio between a length of the image data and the distance to the centroid of the first region in a vertical direction from the reference point are maintained before and after the number-of-pixels conversion. Thereby, a relative positional relationship between the image data and the first region is substantially held before and after the number-of-pixels conversion.

In the number-of-pixels conversion in each of the regions in step S160, when the magnification M applied to the first region is higher than the magnification N applied to the second region, the first region is likely to overlap a portion of an object such as text in the second region after the number-of-pixels conversion. Thus, when N is a non-integer, the number-of-pixels converting unit 12b may determine an integer M that is an integer satisfying a condition that the first region after the number of pixels has been converted by an integer factor does not overlap the object included in the second region after the number of pixels has been converted by a factor of N, and convert the number of pixels in the first region by a factor of M.

In step S150, a case in which the number-of-pixels converting unit 12b has determined an integer greater than N, which is a non-integer, to be the integer M is assumed. In this case, the number-of-pixels converting unit 12b regards the determination of the integer M as a provisional determination, and simulates whether or not the first region in which the number of pixels has been converted by a factor of M overlaps a portion of the object included in the second region in which the number of pixels has been converted by a factor of N. When the first region in which the number of pixels has been converted by a factor of M does not overlap the portion of the object included in the second region in which the number of pixels has been converted by a factor of N as a result of the simulation, the number-of-pixels converting unit 12b finally determines the integer M in the provisional determination to be the integer M, and executes step S160. On the other hand, when the first region in which the number of pixels has been converted by a factor of M overlaps the portion of the object included in the second region in which the number of pixels has been converted by a factor of N as a result of the simulation, the number-of-pixels converting unit 12b determines an integer smaller than the non-integer N to be the integer M, and executes step S160.

The idea of determining the magnification to be applied to the first region so that the first region does not overlap the object in the second region after the number-of-pixels conversion, of course, may be adopted in step S550 of the second embodiment.

The user can set a selection of edge-free printing or edge printing as one of the output conditions of the printing unit 16 through the operation reception unit 14. Edge-free printing is a printing method in which no margins are provided at top, bottom, right, or left edges of a printing medium. Edge printing is a printing method in which margins are provided at top, bottom, right, and left edges of a printing medium. In order to realize edge-free printing, the number-of-pixels converting unit 12b needs to make vertical and horizontal sizes of the image data greater than vertical and horizontal sizes of the printing medium so that there are no margins at the top, bottom, right, or left edges of the printing medium. By way of example only, when a resolution of image data corresponding to size A4 is 360 dpi and printing on print paper with size A4 is performed with a printing resolution of 720 dpi in edge printing, image data according to the printing resolution of 760 dpi is necessary in correspondence to the print paper with size A4 in edge-free printing. Since a size of dots that the printing unit 16 records in correspondence to one pixel is determined, it is possible to further increase a size of an image that the printing unit 16 prints by generating image data with a higher resolution.

Thus, as one embodiment, the number-of-pixels converting unit 12b may set N to a non-integer for edge-free printing based on the image data. That is, when at least edge-free printing is set, the number-of-pixels converting unit 12b determines the magnification N to be a non-integer in step S110. The non-integer magnification N is, of course, a magnification for increasing the number of pixels of the image data to the number of pixels necessary for edge-free printing. In other words, the magnification for increasing the number of pixels of the image data to the number of pixels necessary for edge-free printing is unlikely to be an integer in reality. In the example described above, a non-integer of approximately 2.11 for converting 360 dpi to 760 dpi is determined to be the magnification N. According to such a configuration, it is possible to prevent quality of the code included in the image data from being degraded when the number of pixels of the image data is increased by a non-integer factor in order to print the image data without edges.

The embodiment can also be applied even when the image data is output to a display such as the display unit 13. That is, the control unit 11 can cause the image data subjected to the number-of-pixels conversion according to the embodiment to be displayed on the display. In this case, image data including a code in which quality degradation is eliminated or curbed is displayed.

What is claimed is:
1. An image processing apparatus comprising:
a processor configured to detect a code included in image data and configured to increase the number of pixels of the image data by converting the number of pixels of the image data by a factor of N that is larger than one,
wherein, when N is a non-integer, the processor converts, by an integer factor, the number of pixels in a first region including the code in the image data and con- verts, by the factor of N, the number of pixels in a second region different from the first region in the image data.

2. The image processing apparatus according to claim 1, wherein when N is a non-integer, the processor determines an integer M closest to N and converts the number of pixels in the first region by a factor of M.

3. The image processing apparatus according to claim 2, wherein when there are two integers closest to N, the processor determines the smaller of the two integers to be the integer M.

4. The image processing apparatus according to claim 1, wherein when N is a non-integer, the processor determines an integer M closest to N among integers smaller than N and converts the number of pixels in the first region by a factor of M.

5. The image processing apparatus according to claim 1, wherein when N is a non-integer, the processor determines an integer M that is the integer satisfying a condition that the first region, after the number of pixels is converted by the integer factor, does not overlap an object included in the second region after the number of pixels is converted by the factor of N, and converts the number of pixels in the first region by a factor of M.

6. The image processing apparatus according to claim 1, wherein the processor sets N to a non-integer for edge-free printing based on the image data.

7. An image processing method comprising:

detecting a code included in image data; and increasing the number of pixels of the image data by converting the number of pixels of the image data by a factor of N that is larger than one, wherein the increasing of the number of pixels of the image data includes, when N is a non-integer, converting, by an integer factor, the number of pixels in a first region including the code in the image data and converting, by the factor of N, the number of pixels in a second region different from the first region in the image data.

* * * * *